Oct. 30, 1923.  1,472,593
C. GREEN
WHEEL FOR ROAD VEHICLES
Filed May 24, 1921  2 Sheets-Sheet 1
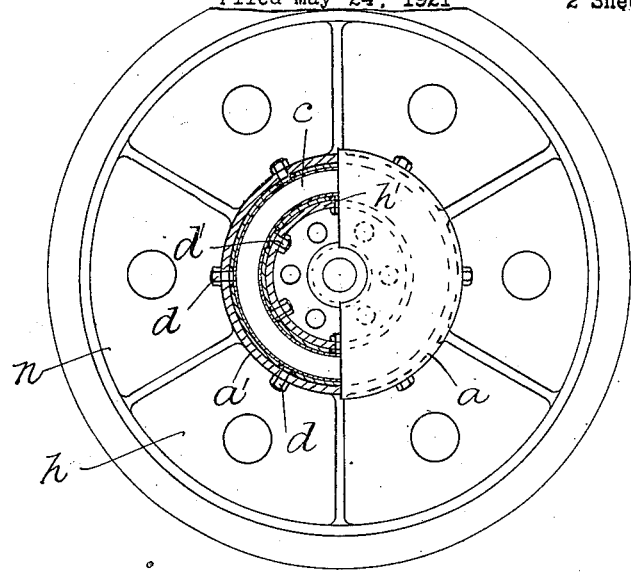
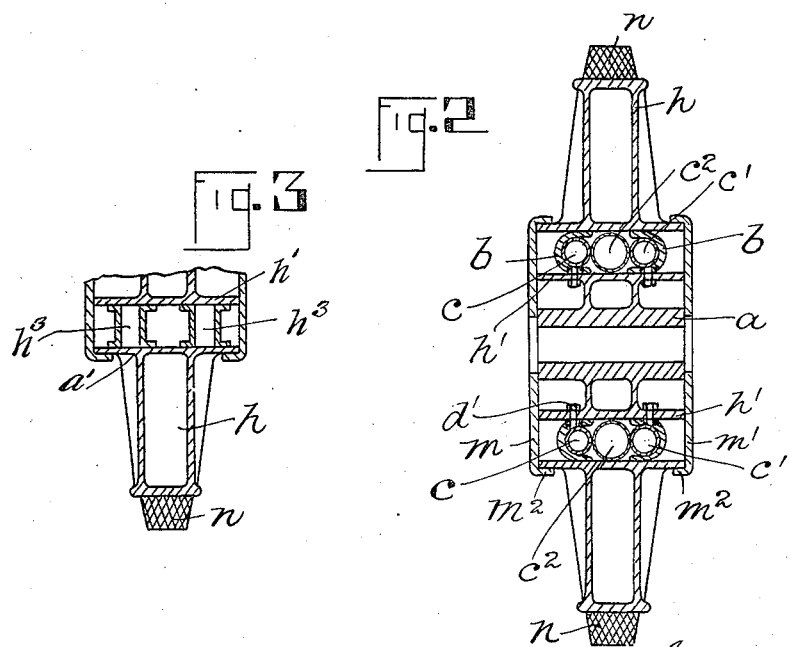

Oct. 30, 1923.
C. GREEN
1,472,593
WHEEL FOR ROAD VEHICLES
Filed May 24, 1921
2 Sheets-Sheet 2
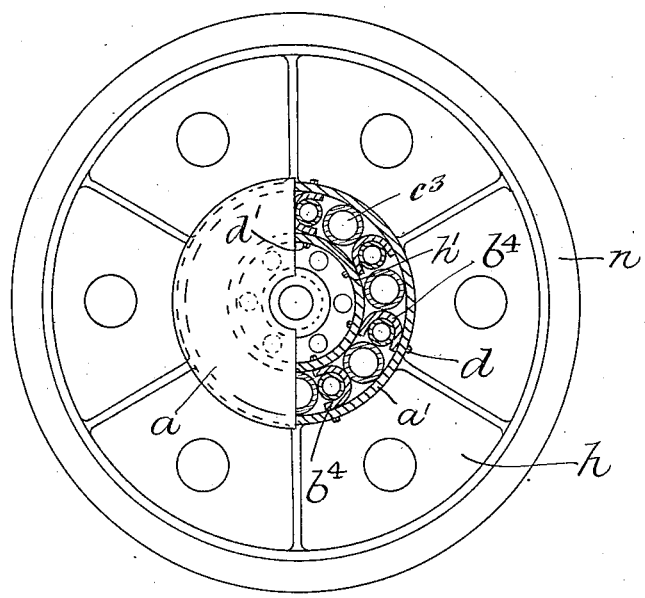
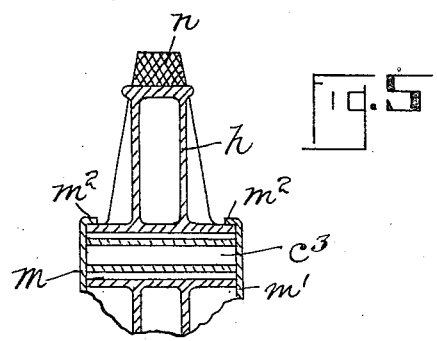
Inventor
Collingwood Green
by Wright Brown Quinby May
Attorneys Patented Oct. 30, 1923.

1,472,593

UNITED STATES PATENT OFFICE.

COLLINGWOOD GREEN, OF BOLTON, ENGLAND.

WHEEL FOR ROAD VEHICLES.

Application filed May 24, 1921. Serial No. 472,124.

*To all whom it may concern:*

Be it known that I, COLLINGWOOD GREEN, a subject of the King of Great Britain, and resident of Bolton, in the county of Lancaster, England, have invented a certain new and useful Improvement in or Appertaining to Wheels for Road Vehicles, of which the following is a specification.

My invention relates to improvements in or appertaining to wheels for road vehicles, of the type which are provided with a pneumatic device intervening between the hub and the rim for the purpose of allowing the necessary or desired resilience for the wheel without the danger of the pneumatic device being punctured or damaged, as is the case where pneumatic tyres are employed. My said invention consists in an improved construction of such pneumatic devices or cushion whereby the same is rendered comparatively cheap to manufacture and does not readily become damaged or injured, and forms an efficient driving device acting between the hub and the tyre.

In order that my said invention may be readily understood, I have hereunto appended two sheets of drawings illustrative thereof, to which, by figures and letters, reference is made in the following description.

Fig. 1 is a part sectional side elevation of a wheel constructed in accordance with my said invention.

Fig. 2 is a sectional elevation as seen at right angles to Fig. 1.

Fig. 3 is a similar view to Fig. 2, and illustrates a modification thereof.

Fig. 4 is a similar view to Fig. 1 and shows a further modification.

Fig. 5 is a section end elevation of a portion of the wheel shown by Fig. 4.

In carrying my invention into effect I form the hub $a$ with its rim or outer surface $a^1$ preferably concentric with the centre or axle of the wheel. Fixed to the rim or outer surface $a^1$ of the hub $a$ by bolts or other fixing devices $d$ are leather or like annular parts $b$, preferably of U shape in cross section as shown by Fig. 2. These annular parts $b$ enclose tubes $c$, $c^1$ which may have air therein under comparatively high pressure or which may be tubes containing air under normal pressure. A centrally disposed tube $c^2$ is also preferably employed in conjunction with the tubes $c$, $c^1$. The annular parts $b$ are fixed by means of bolts or the like $d^1$ to an inner flange or rim $h^1$ of the wheel or felloe $h$. The leather or like annular parts form the device for driving the wheel or transmitting power between the hub $a$ and wheel $h$.

Fitting over the hub $a$ are plates $m$, $m^1$ provided with inwardly extending flanges $m^2$ against which fit the flange or inner rim $h^1$. These plates $m$, $m^1$ act as guides to keep the hub $a$ and outer part $h$ in alignment with each other and prevent lateral movement of the wheel as it travels over the ground. The tyre $n$ may be solid or hollow as desired.

From the foregoing description it will be seen that as the wheel moves over the ground the weight of the vehicle will cause the tubes $c$, $c^1$, $c^2$ to be compressed and the hub $a$ will move between the plates $m$, $m^1$ to accommodate the weight of said vehicle, this resilience being equivalent to that usually obtained by the use of pneumatic tyres, while the power from the hub $a$ to the wheel $h$ is efficiently transmitted in all positions by the parts $b$.

Instead of employing annular tubes $c$, $c^1$, $c^2$ I may use radially disposed tubes $h^3$ as shown by Fig. 3, these being fixed respectively to the plates $a^1$ and $h^1$. They may have compressed air fed to them or may contain air under normal pressure. Another modification consists in employing curved sections of leather or the like $b^4$ as shown by Figs. 4 and 5, these extending cross wise the opening intervening between the hub $a$ and wheel $h$ to which they are respectively attached by bolts $d$, $d^1$ or the like, so as to form the driving medium as in the above cases. Tubes $c^3$ are or may be arranged to intervene between the sections $b^4$, these tubes $c^3$ being supplied with compressed air to act as cushioning devices between said hub $a$ and wheel $n$.

Such being the nature and object of my said invention, what I claim is:—

1. In a wheel for road vehicles, the combination with a hub comprising two concentric radially separated, members, of a plurality of flexible bands, of substantially U-shape in cross section, extending around the inner hub member and secured to both said members to form a driving connection between them, a resilient tube embraced by each member of said flexible driving connection, for the purpose described, and an auxiliary resilient tube surrounding the inner hub member between two adjacent members of the driving connection.

2. In a wheel for road vehicles, the combination with a hub comprising two concentric, radially separated, members, of two flexible bands, of substantially U-shape in cross section, extending around the inner hub member and secured to both said members to form a driving connection between them, the open sides of said flexible bands being opposed to each other, a resilient tube within the channel formed by each said flexible member, and a third resilient tube extending about the inner hub member between the tubes embraced by the said driving connections, for the purpose described.

COLLINGWOOD GREEN.